(12) United States Patent
Zhang et al.

(10) Patent No.: US 10,769,758 B2
(45) Date of Patent: Sep. 8, 2020

(54) RESOLVING METHOD AND SYSTEM BASED ON DEEP LEARNING

(71) Applicant: BOE Technology Group Co., Ltd., Beijing (CN)

(72) Inventors: Lijie Zhang, Beijing (CN); Zhenglong Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 359 days.

(21) Appl. No.: 15/537,677

(22) PCT Filed: Jun. 21, 2016

(86) PCT No.: PCT/CN2016/086494
§ 371 (c)(1),
(2) Date: Jun. 19, 2017

(87) PCT Pub. No.: WO2017/161710
PCT Pub. Date: Sep. 28, 2017

(65) Prior Publication Data
US 2018/0089803 A1    Mar. 29, 2018

(30) Foreign Application Priority Data

Mar. 21, 2016 (CN) .................. 2016 1 016 1589

(51) Int. Cl.
*G06T 3/40* (2006.01)
*G06K 9/00* (2006.01)
(Continued)

(52) U.S. Cl.
CPC ........ *G06T 3/4076* (2013.01); *G06K 9/00234* (2013.01); *G06K 9/00268* (2013.01);
(Continued)

(58) Field of Classification Search
CPC ........... G06K 9/00234; G06K 9/00268; G06K 9/4628; G06K 9/00281; G06K 9/2081;
(Continued)

(56) References Cited

U.S. PATENT DOCUMENTS 8,526,765 B2    9/2013    Sakaguchi et al.
8,805,120 B2 *  8/2014    Min ...................... G06T 3/4046
                                                  382/224
(Continued)

FOREIGN PATENT DOCUMENTS

CN    101216889 A    7/2008
CN    101299235 A    11/2008
(Continued)

OTHER PUBLICATIONS

Dec. 28, 2016—(WO) International Search Report and Written Opinion Appn PCT/CN2016/086494 with English Translation.
(Continued)

*Primary Examiner* — Kim Y Vu
*Assistant Examiner* — Michael J Vanchy, Jr.
(74) *Attorney, Agent, or Firm* — Banner & Witcoff, Ltd.

(57) ABSTRACT

A resolving method and a system, the method includes: creating a sample library by utilization of an original high-resolution (HR) image set; training a convolutional structural network by utilization of the sample library; and obtaining an HR output signal by processing a low-resolution (LR) input signal by utilization of the trained convolutional structural network. In the resolving method and system according to this disclosure, data after expansion may be processed by simple expansion hardware, without a large change algorithm; and complex algorithms are allocated into parallelizing design, and different servers operate mutually independent; and also, due to the modular design, the design proposals of functional modules may be modified by latter optimization.

18 Claims, 8 Drawing Sheets

(51) Int. Cl.
  *G06K 9/46* (2006.01)
  *G06N 3/08* (2006.01)
  *G06N 3/04* (2006.01)
  *G06N 3/02* (2006.01)

(52) U.S. Cl.
  CPC ......... *G06K 9/4628* (2013.01); *G06N 3/0454* (2013.01); *G06N 3/08* (2013.01); *G06T 3/4053* (2013.01); *G06N 3/02* (2013.01)

(58) Field of Classification Search
  CPC .......... G06N 3/02; G06N 3/0454; G06N 3/08; G06T 3/4053; G06T 3/4076; G06F 21/32; G07C 9/37
  See application file for complete search history.

(56) References Cited

U.S. PATENT DOCUMENTS

| | | | | |
|---|---|---|---|---|
| 2012/0299906 | A1* | 11/2012 | Shiell | G06T 15/04 345/419 |
| 2013/0241633 | A1 | 9/2013 | Honda | |
| 2015/0363634 | A1* | 12/2015 | Yin | G06K 9/00221 382/118 |
| 2017/0032285 | A1* | 2/2017 | Sharma | G06N 3/08 |

FOREIGN PATENT DOCUMENTS

| | | |
|---|---|---|
| CN | 101477684 A | 7/2009 |
| CN | 101719270 A | 6/2010 |
| CN | 101950415 A | 1/2011 |
| CN | 103020940 A | 4/2013 |
| CN | 104899830 A | 9/2015 |
| CN | 105120130 A | 12/2015 |
| CN | 204948182 U | 1/2016 |
| WO | 2015141463 A1 | 9/2015 |

OTHER PUBLICATIONS

Nov. 16, 2016—(CN) First Office Action Appn 201610161589.2 with English Translation.
Feb. 4, 2017—(CN) Second Office Action Appn 201610161589.2 with English Translation.
Jun. 5, 2018—(CN) Third Office Action Appn 201610161589.2 with English Translation.

* cited by examiner

RESOLVING METHOD AND SYSTEM BASED ON DEEP LEARNING

The application is a U.S. National Phase Entry of International Application No. PCT/CN2016/086494 filed on Jun. 21, 2016, designating the United States of America and claiming priority to Chinese Patent Application No. 201610161589.2 filed on Mar. 21, 2016. The present application claims priority to and the benefit of the above-identified applications and the above-identified applications are incorporated by reference herein in their entirety.

TECHNICAL FIELD

The present invention relates to the image processing field in television display, in particular to face and image high-resolution (HR) resolving method and system based on deep learning.

BACKGROUND

Super-resolution is put forward for the fact that the resolution of the current video signal source is lower than the displayable resolution of a high-definition television (HDTV). The super-resolution technology is to output an image, which is more suitable to be displayed on a full high definition (FHD) liquid crystal display (LCD) TV, by stretching, comparing and correcting an initial image, and hence enhance the virtual clarity. Compared with the case that a common LCD TV is only to simply stretch and amplify a standard-definition (SD) signal to a high-definition (HD) screen, the super-resolution technology has more prominent display details and changes people's impression that the watching of a wired DVD on an HDTV is not so good as on a low-definition television (LDTV).

The resolution of image, also referred to as definition and resolving power, refers to the number of pixels capable of being displayed on a display. When the number of pixels on the display is larger, the image is finer. An HR image has high pixel density, can provide rich detail information, and can more accurately and meticulously describe an objective scene. The HR images are widely used in the information age and have very important applications in the fields such as satellite remote sensing images, video security monitoring, military detection aerial photography, medical digital imaging and video standard conversion.

Facial metamorphosis is a specific area super-resolution technology for generating HR output from low-resolution (LR) input. An LR image is obtained by the downsampling and linear convolution of an HR image. The metamorphosis technology may be construed as the reconstruction of high-frequency details. The current super-resolution technology is rarely relevant to facial metamorphosis.

SUMMARY

Face and image high-resolution (HR) resolving method and system based on deep learning are provided in the embodiments of this disclosure. According to one aspect of this disclosure, a resolving method is provided, comprising: creating a sample library by utilization of an original high-resolution (HR) image set; training a convolutional structural network by utilization of the sample library; and obtaining an HR output signal by processing a low-resolution (LR) input signal by utilization of the trained convolutional structural network.

According to another aspect of this disclosure, a resolving system is provided, comprising: a sample library creating device configured to create a sample library by utilization of an original HR image set; a training device configured to train a convolutional structural network by utilization of the sample library; and an output device configured to obtain an HR output signal by processing an LR input signal by utilization of the trained convolutional structural network.

The method of this disclosure adds similarity information of face feature parts when resolving and enlarging by utilization of information of the originally inputted image, enriches the details of the human face in the resolved image, and hence obviously improves the definition.

In the resolving method and system according to this disclosure, data after expansion may be processed by simple expansion hardware, without a large change algorithm; and complex algorithms are allocated into parallelizing design, and different servers operate mutually independent; and also, due to the modular design, the design proposals of functional modules may be modified by latter optimization.

DETAILED DESCRIPTION

Figure 1:
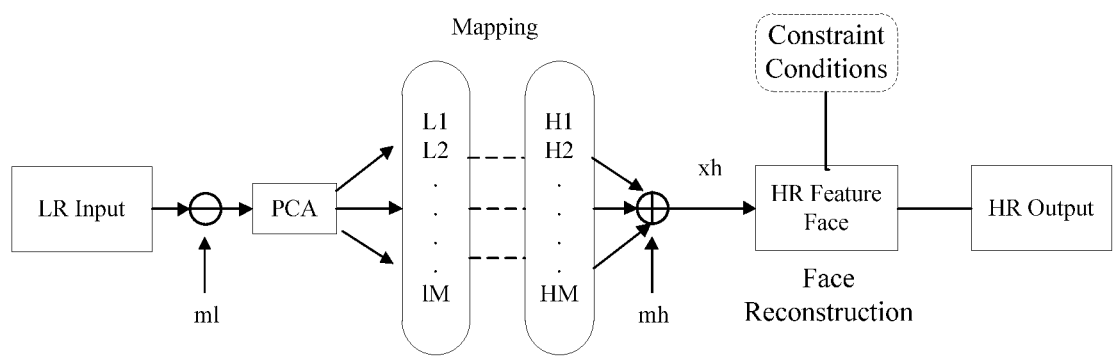
FIG. 1 is a universal method of a face resolving technology.

For more clear understanding of the characteristics and the advantages of the present invention, detailed description will be given below to the preferred embodiments of the present invention with reference to the accompanying drawings. The same reference numerals in the accompanying drawings refer to units with same structure.

Description will be given below to the embodiments of the present invention with reference to the accompanying drawings. However, the present invention may have various different implementation means and should not be limited to the embodiments described here. The components are enlarged in the accompanying drawings for clarity.

FIG. 1 is a universal method of the face resolving technology.

As shown in FIG. 1, a principal component analysis (PCA) algorithm is adopted for face recognition. An LR image is mapped to an HR image; face reconstruction is performed by utilization of constraint conditions; and finally, the HR image is outputted.

Figure 2:
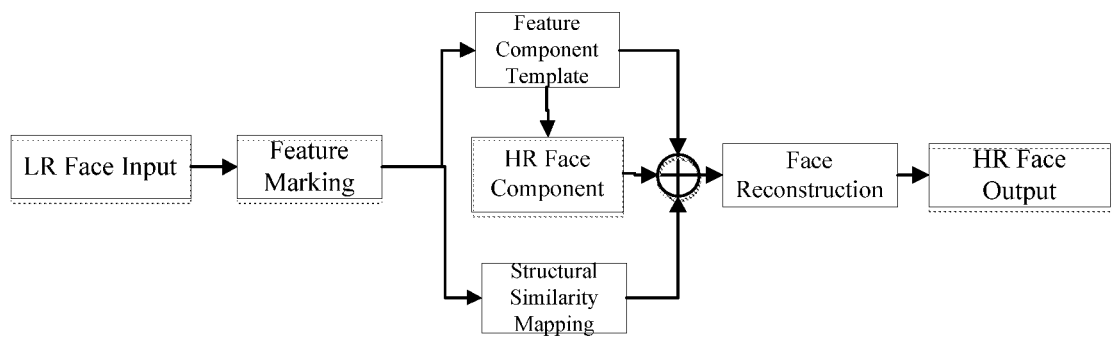
FIG. 2 is another universal method of the face resolving technology.

FIG. 2 is another universal method of the face resolution technology.

As shown in FIG. 2, firstly, LR face images are inputted; secondly, the features of the human face are detected, and detected features (eyes/nose/mouth) are marked; thirdly, different features of the face are extracted, and a plurality of different feature component templates are obtained; fourthly, high-frequency components, namely HR face components in the images, are obtained by continuous extraction from the templates by utilization of a high-pass filtering function; fifthly, as the human face has high designability, the inputted face images may be subjected to feature mapping by utilization of a structural similarity function, and high-frequency details with high similarity are added to complete the reconstruction of the human face; and finally, HR face images are outputted.

The above method has the problems:

1. The coefficient in a mapping function of HR and LR face feature map pairs is determined and unique, and once the coefficient is fixed, corresponding feature map pairs cannot be modified and have poor portability and expandability.

2. The filling of the details in the reconstruction of the features of the human face is created on a reconstructed image, so the output result is less natural and unreal.

In order to solve the above problems, the present invention provides the following resolutions:

The resolution of the problem 1:

a training model of a high and low resolution face library is created by utilization of a deep neutral network (DNN), and a sample library and the number may be randomly modified subsequently after model fitting, as long as the entire training model is updated and new feature filtering parameters are obtained.

The resolution of the problem 2:

main features of the HR face are marked in the process of training the entire high and low resolution face model; marked image blocks are subjected to detail model training by utilization of high and low pass filters; and corresponding detail filling filtering parameters are obtained.

The method adds similarity information of face feature parts when resolving and enlarging by utilization of information of the originally inputted image, enriches the details of the human face in the resolved image, and hence obviously improves the definition.

Figure 3:
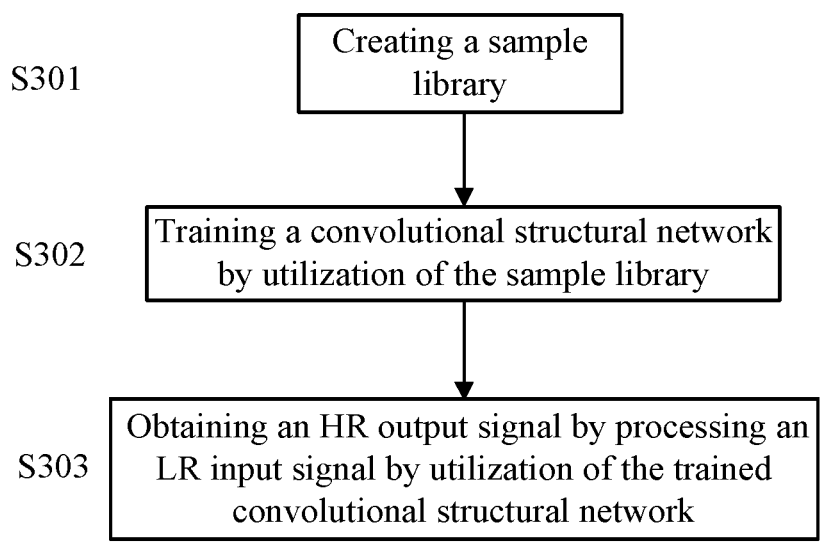
FIG. 3 is a flow diagram of a resolving method provided by the embodiment of the present invention.

FIG. 3 is a flow diagram of a resolving method provided by the embodiment of the present invention.

As shown in FIG. 3, in the step S301, a sample library is created by utilization of an original HR image.

In the step S302, a convolutional structural network is trained by utilization of the sample library.

In the step S303, an HR output signal is obtained by processing an LR input signal by utilization of the trained convolutional structural network.

Figure 4:
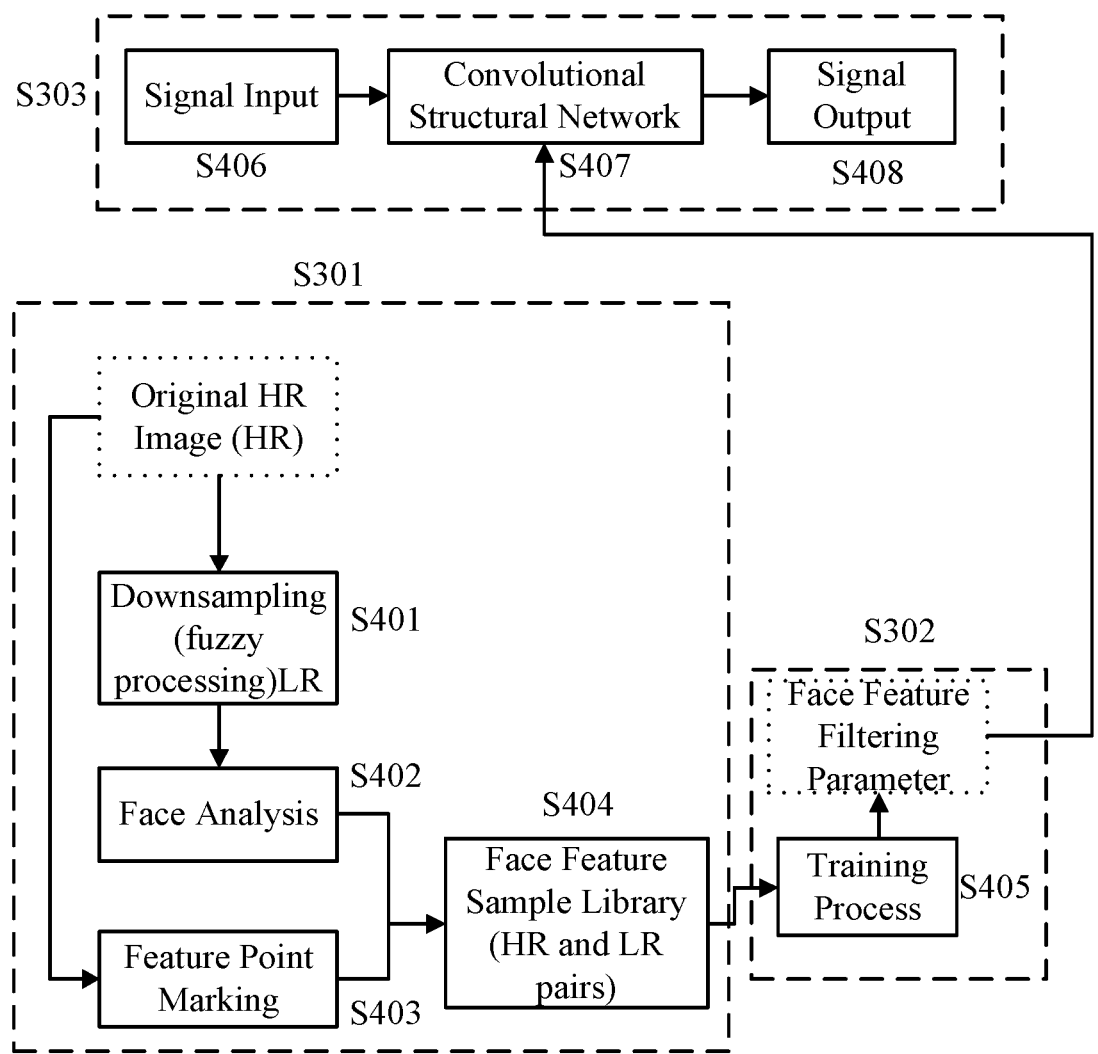
FIG. 4 is a specific flowchart of the resolving method in FIG. 3 provided by at least one embodiment of the present invention.

FIG. 4 is a specific flowchart of the resolving method in FIG. 3 provided by at least one embodiment of the present invention.

As shown in FIG. 4, the step S301 in FIG. 3 further includes the steps S401 to S404.

S401: obtaining an LR image set by the downsampling process of an original HR image set, in which the downsampling process, for instance, may adopt linear convolution processing or the conventional or future processing method capable of achieving the same function.

S402: extracting face feature information of LR images by a face feature extraction method, in which the face feature extraction method may be edge detection algorithm or the conventional or future method capable of achieving the same function.

S403: obtaining face feature information of HR images by marking face feature points on the HR images. The structure of the face image mainly includes face components, contour and smooth areas. The marks detect local face components and contour.

S404: creating a face feature sample library, including pairs of the face feature information of the LR images and relevant face feature information of the HR images, by utilization of the face feature information of the LR images and the face feature information of the HR images.

As shown in FIG. 4, the step S302 in FIG. 3 further includes the step S405. In the step S405, first filtering parameters are obtained by training the pairs of the face feature information of the LR images and the HR images in the face feature sample library. The first filtering parameters are, for instance, classifier filtering parameters for the convolutional structural network.

As shown in FIG. 4, the step S303 in FIG. 3 further includes the steps S406 to S408.

S406: inputting the face feature information of the LR images as an input signal.

S407: processing the inputted face feature information of the LR images by utilization of the convolutional structural network according to adjusted first filtering parameters obtained in the step S405.

S408: outputting face feature information of the HR images, processed by the convolutional structural network, as an output signal.

Figure 5:
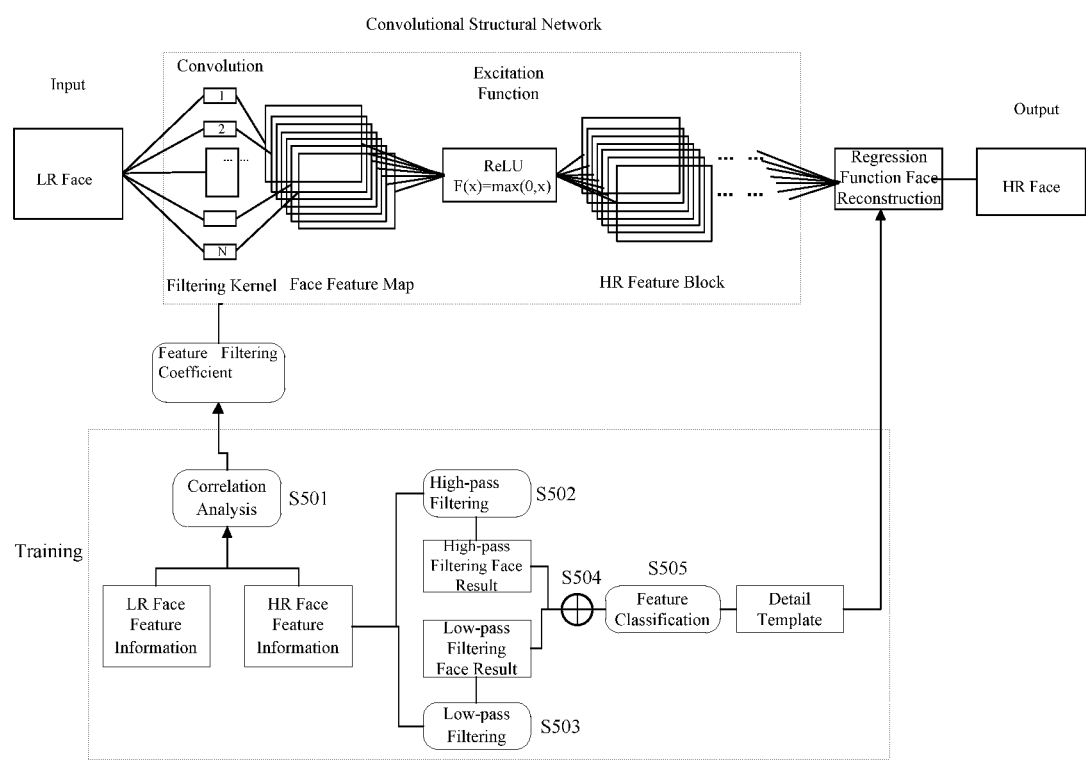
FIG. 5 illustrates the specific implementation of the training process S405 in FIG. 4.

FIG. 5 is a specific flowchart of the training process S405 in FIG. 4.

As shown in FIG. 5, in the step S501, the first filtering parameters for the convolutional structural network are obtained by analyzing the correlation between the pairs of the face feature information of the LR images and the relevant face feature information of the HR images in the face feature sample library.

In the steps S502 and S503, the face feature information of the HR images is respectively subjected to high-pass filtering and low-pass filtering to obtain high-frequency face feature information as a high-pass filtering face result and low-frequency face feature information as a low-pass filtering face result. Wherein, high-frequency features, e.g., structure and contour information of the human face, may be obtained by the high-pass filtering of the face feature information; and refined information, e.g., details such as skin texture and roughness of the human face, may be obtained by the low-pass filtering of the face feature information.

In the step S504, a superimposed result is obtained by the superimposition of the high-pass filtering face result and the low-pass filtering face result, namely the superimposition of extracted high-frequency and low-frequency information (feature contour and detail texture).

In the step S505, the superimposed result is subjected to feature classification, and a detail template of the face feature information of the HR images is obtained and taken as a feedback signal of the convolutional structural network. For instance, different features such as a, b and c are respectively taken as a class, and different types of detail templates are obtained.

The face feature information of the LR images is taken as an input signal of the convolutional structural network; the first filtering parameters in the convolutional structural network are adjusted; and a forecast result signal, obtained by processing the input signal in the convolutional structural network according to the adjusted first filtering parameters, can be basically the same with the feedback signal. That is to say, the difference between the forecast result signal and the feedback signal is less than a first threshold. The first threshold may be set according to actual conditions. For instance, the first threshold may be less than or equal to 0.01.

Subsequently, the face feature information of the HR images is obtained by processing the face feature information of the LR images by utilization of the convolutional structural network according to the adjusted first filtering parameters.

As shown in FIG. 5, the convolutional structural network is formed by the alternate connection of a plurality of convolutional layers and excitation layers. The number of the convolutional layers and the excitation layers may be set according to actual conditions, for instance, may be 2 or more. In the convolutional structural network, except input and output, each of the remaining layers takes the output of the previous layer as input and transmits the output of the layer to the next layer.

Each convolutional layer may include a plurality of filter units with adjustable filtering parameters. The number of the filter units in each convolutional layer may be same or different.

In the convolutional layer, a face feature map after convolution is obtained by extracting features from the input signal or a feature map of the previous layer by a convolution operation. In general, each filter unit adopts the following formula to execute a convolution operation: $F(x)=Wx+b$, in which W and b refer to filtering parameters; x refers to input; and $F(x)$ refers to output.

The excitation layer is configured to remove features to which the human eyes have low sensitivity. The excitation layer, for instance, may be implemented by an excitation function $F(x)=max(0,x)$. That is to say, a feature map with the highest sensitivity is found by removing the features to which the human eyes have low sensitivity, namely the features satisfying $F(x) \leq 0$.

When the forecast result signal in which $$(I_{\overline{HR}_i} = \sum_{i=0}^{m} W_i FM_i + b,$$

in which $I_{\overline{HR}_i}$ refers to the forecast result signal (namely feature value); m refers to the number of image sets in the face feature sample library; $FM_i$ refers to a feature map outputted by the final excitation layer) is obtained by the convolutional structural network, compared with the feedback signal, the error rate such as mean square error $J(W,b)$ is calculated by utilization of the following variance function; the partial derivative of the filtering parameter on the error rate is calculated for each filtering parameter; and subsequently, the filtering parameter is adjusted according to the partial derivative (gradient):

$$J(W, b) = \frac{1}{m}\sum_{i=1}^{m}\left(\frac{1}{2}\left\|h_{W,b}(I_{HR_i} - I_{\overline{HR}_i})\right\|^2\right)$$

where $J(W,b)$ refers to the mean square error; m refers to the number of image sets in the face feature sample library; $I_{HR_i}$ refers to the feedback signal; $I_{\overline{HR}_i}$ refers to the forecast result signal; hW,b refers to the weight coefficient; and hW,b is an empiric value, 1 as default, and is adjusted according to the network complexity and relying on experience.

Figure 6:
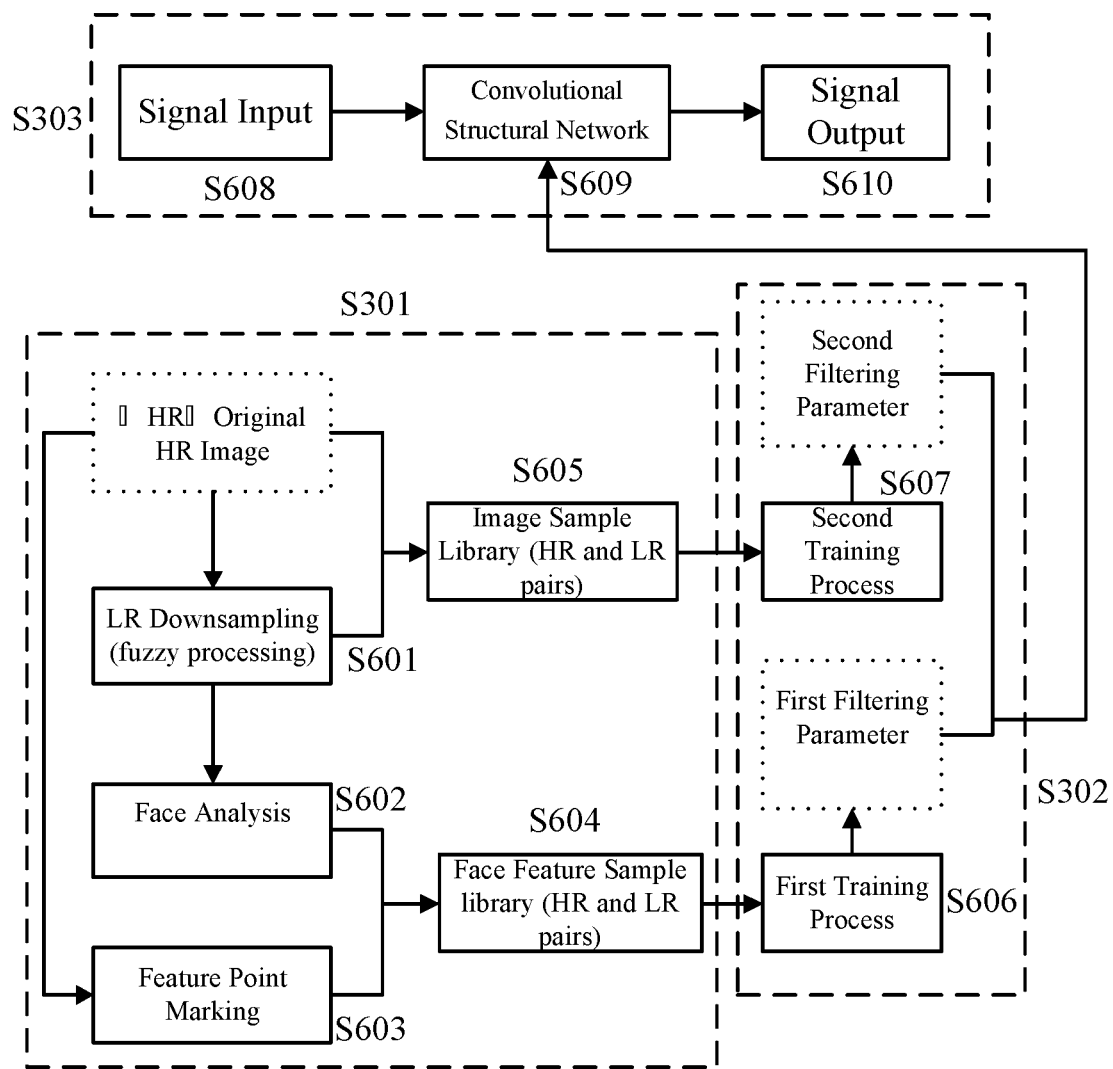
FIG. 6 is a specific flowchart of the resolving method in FIG. 3 provided by at least one embodiment of the present invention.

FIG. 6 is a specific flowchart of the resolving method in FIG. 3 provided by at least one embodiment of the present invention.

As shown in FIG. 6, the step S301 in FIG. 3 further includes the steps S601 to S605.

S601: obtaining an LR image set by the downsampling of an original HR image set, in which the downsampling process, for instance, may be linear convolution processing or the conventional or future processing method capable of achieving the same function.

S602: extracting the face feature information of the LR images from the LR images by a face feature extraction method, in which the face feature extraction method may be edge detection algorithm or the conventional or future method capable of achieving the same function.

S603: obtaining the face feature information of the HR images by marking face feature points on the HR images.

S604: creating a face feature sample library, including pairs of the face feature information of the LR images and relevant face feature information of the HR images, by utilization of the face feature information of the LR images and the face feature information of the HR images.

S605: creating an image sample library, including pairs of the LR images and relevant HR images, by utilization of the LR images and the HR images.

As shown in FIG. 6, the step S302 in FIG. 3 further includes the steps S606 and S607.

S606: obtaining first filtering parameters by training the pairs of the face feature information of the LR images and the HR images in the face feature sample library.

S607: obtaining second filtering parameters by training the pairs of the LR images and the HR images in the image sample library.

As shown in FIG. 6, the step S303 in FIG. 3 further includes the steps S608 to S610.

S608: inputting LR information as an input signal.

S609: processing the input signal by utilization of a convolutional structural network according to adjusted first filtering parameters obtained in the step S606 and adjusted second filtering parameters obtained in the step S607.

S610: outputting HR information, processed by the convolutional structural network, as an output signal.

The first training process S606 in FIG. 6 is the same with the training process S405 in FIG. 4. No further description will be given here.

Figure 7:
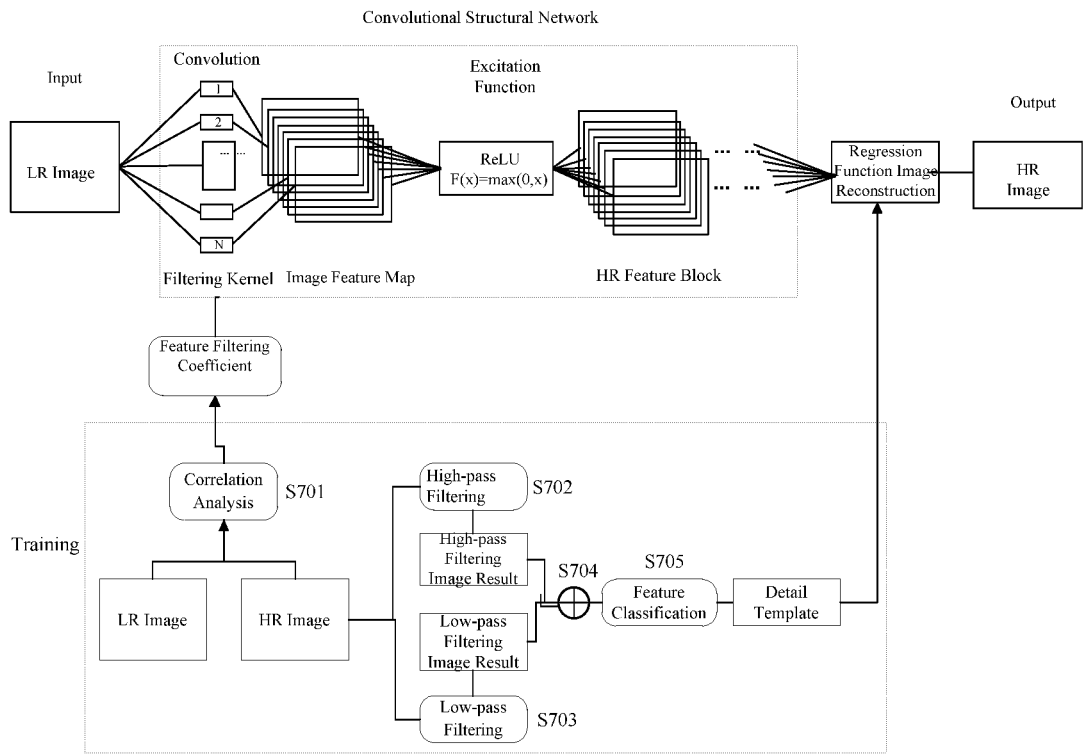
FIG. 7 illustrates the specific implementation of the second training process S607 in FIG. 6.

FIG. 7 illustrates the specific implementation of the second training process S607 in FIG. 6.

As shown in FIG. 7, in the step S701, the second filtering parameters of the convolutional structural network are obtained by analyzing the correlation between the pairs of the LR images and relevant HR images in the image sample library.

In the steps S702 and S703, the HR images are respectively subjected to high-pass filtering and low-pass filtering to obtain high-frequency image information as a high-pass filtering image result and low-frequency image information as a low-pass filtering image result, in which the high-frequency image information, namely relatively prominent features in the image, may be obtained by the high-pass filtering of the image; and the low-frequency image information, namely detail texture features in the image, may be obtained by the low-pass filtering of the image.

In the step S704, a superimposed result is obtained by the superimposition of the high-pass filtering face result and the low-pass filtering face result, namely the superimposition of extracted high-frequency and low-frequency information (feature contour and detail texture).

In the step S705, the superimposed result is subjected to feature classification, and a detail template of the HR images is obtained and taken as a feedback signal of the convolutional structural network. For instance, different features such as a, b and c are respectively taken as a class, and different types of detail templates are obtained.

The LR image is taken as an input signal of the convolutional structural network; the second filtering parameters in the convolutional structural network are adjusted; and a forecast result signal, obtained by processing the input signal in the convolutional structural network according to the adjusted second filtering parameters, can be basically the same with the feedback signal. That is to say, the difference between the forecast result signal and the feedback signal is less than a first threshold. The first threshold may be set according to actual conditions. For instance, the first threshold may be less than or equal to 0.01.

Subsequently, the HR images are obtained by processing the LR images by utilization of the convolutional structural network according to the adjusted first filtering parameters.

The specific training process of the second training process S 707 is similar to the specific training process of the training process S405 in FIG. 4. The difference is that: the pairs of the face feature information of the LR images and the relevant face feature information of the HR images in the face feature sample library are replaced by the pairs of the LR image and the HR images in the image sample library created in the step S705 in FIG. 7. Therefore, no further description will be given here.

Figure 8:
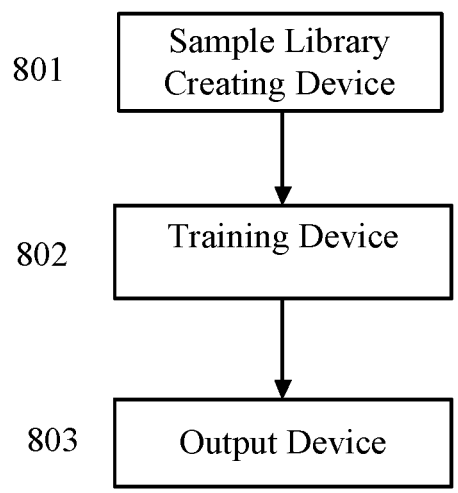
FIG. 8 is a block diagram of a resolving system provided by the embodiment of the present invention.

FIG. 8 is a block diagram of a resolving system provided by the embodiment of the present invention.

As illustrated in FIG. 8, the resolving system comprises: a sample library creating device 801, a training device 802 and an output device 803.

The sample library creating device 801 is configured to create a sample library by utilization of original HR images.

The training device 802 is configured to train a convolutional structural network by utilization of the sample library.

The output device 803 is configured to obtain an HR output signal by processing an LR input signal by utilization of the trained convolutional structural network.

Figure 9:
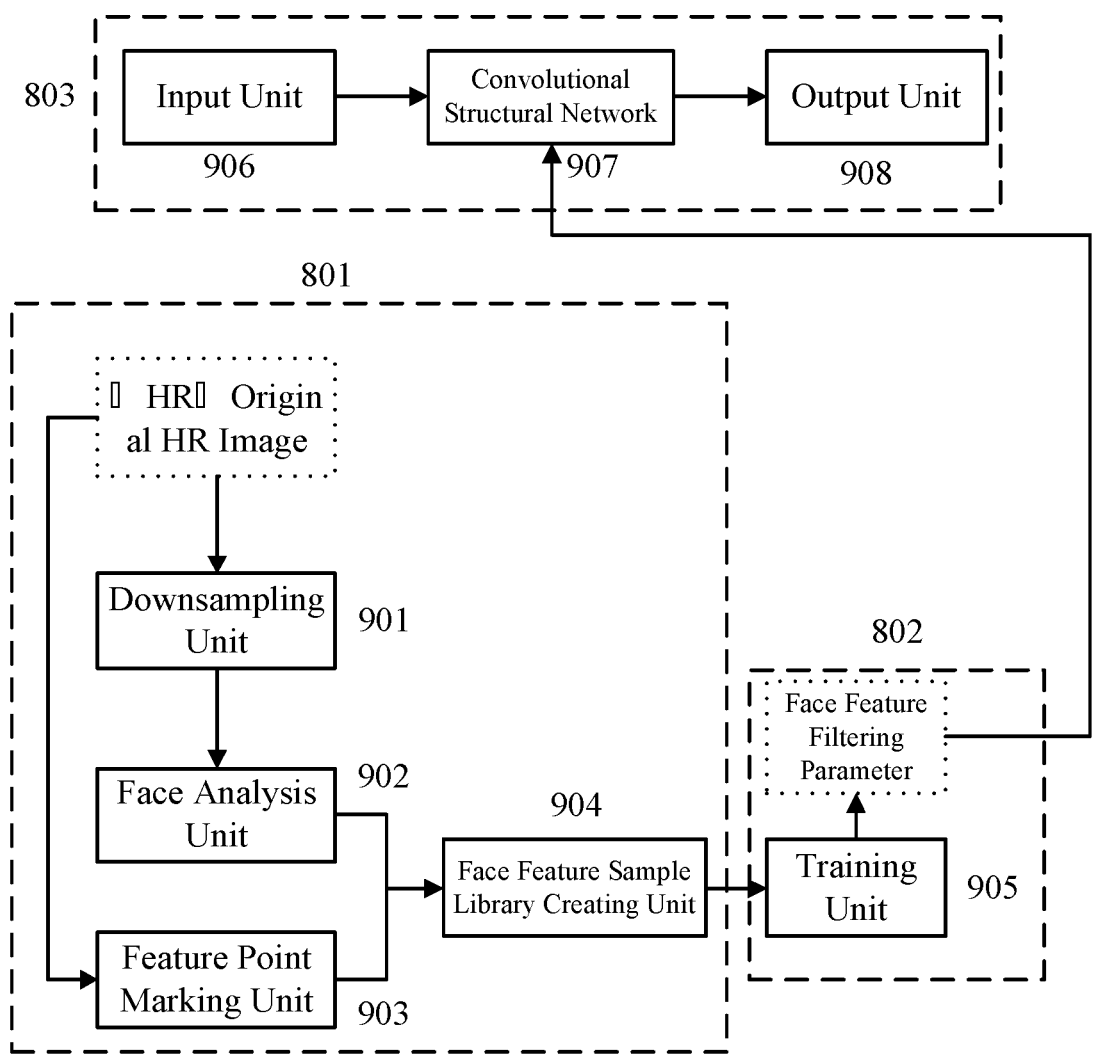
FIG. 9 is a block diagram illustrating the specific implementation of the resolving system in FIG. 8 provided by at least one embodiment of the present invention.

FIG. 9 is a block diagram illustrating the specific implementation of the resolving system in FIG. 8 provided by at least one embodiment of the present invention.

As shown in FIG. 9, the sample library creating device 801 in FIG. 8 further includes: a downsampling unit 901, a face analysis unit 902, a feature point marking unit 903, a face feature sample library creating unit 904. The training device 802 in FIG. 8 further includes a training unit 905. The output device 803 in FIG. 8 further includes: an input unit 906, a convolutional structural network 907 and an output unit 908.

The downsampling unit 901 is configured to obtain an LR image set by the downsampling of an original HR image set, in which the downsampling process, for instance, may adopt linear convolution processing or the conventional or future processing method capable of achieving the same function.

The face analysis unit 902 is configured to extract face feature information of LR images from the LR images by a face feature extraction method, in which the face feature extraction method may be edge detection algorithm or the conventional or future method capable of achieving the same function.

The feature point marking unit 903 is configured to obtain face feature information of HR images by marking face feature points on the HR images. The structure of the face image mainly includes face components, contour and smooth areas. The marks detect local face components and contour.

The face feature sample library creating unit 904 is configured to create a face feature sample library, including pairs of the face feature information of the LR images and relevant face feature information of the HR images, by utilization of the face feature information of the LR images and the face feature information of the HR images.

The training unit 905 is configured to obtain first filtering parameters by training the pairs of the face feature information of the LR images and the HR images in the face feature sample library. The first filtering parameters are, for instance, classifier filtering parameters for the convolutional structural network.

The input unit 906 is configured to input the face feature information of the LR images as an input signal.

The convolutional structural network 907 is configured to process the inputted face feature information of the LR images by utilization of the convolutional structural network according to the adjusted first filtering parameters.

The output unit 908 is configured to output face feature information of the HR images, processed by the convolutional structural network, as an output signal.

Figure 10:
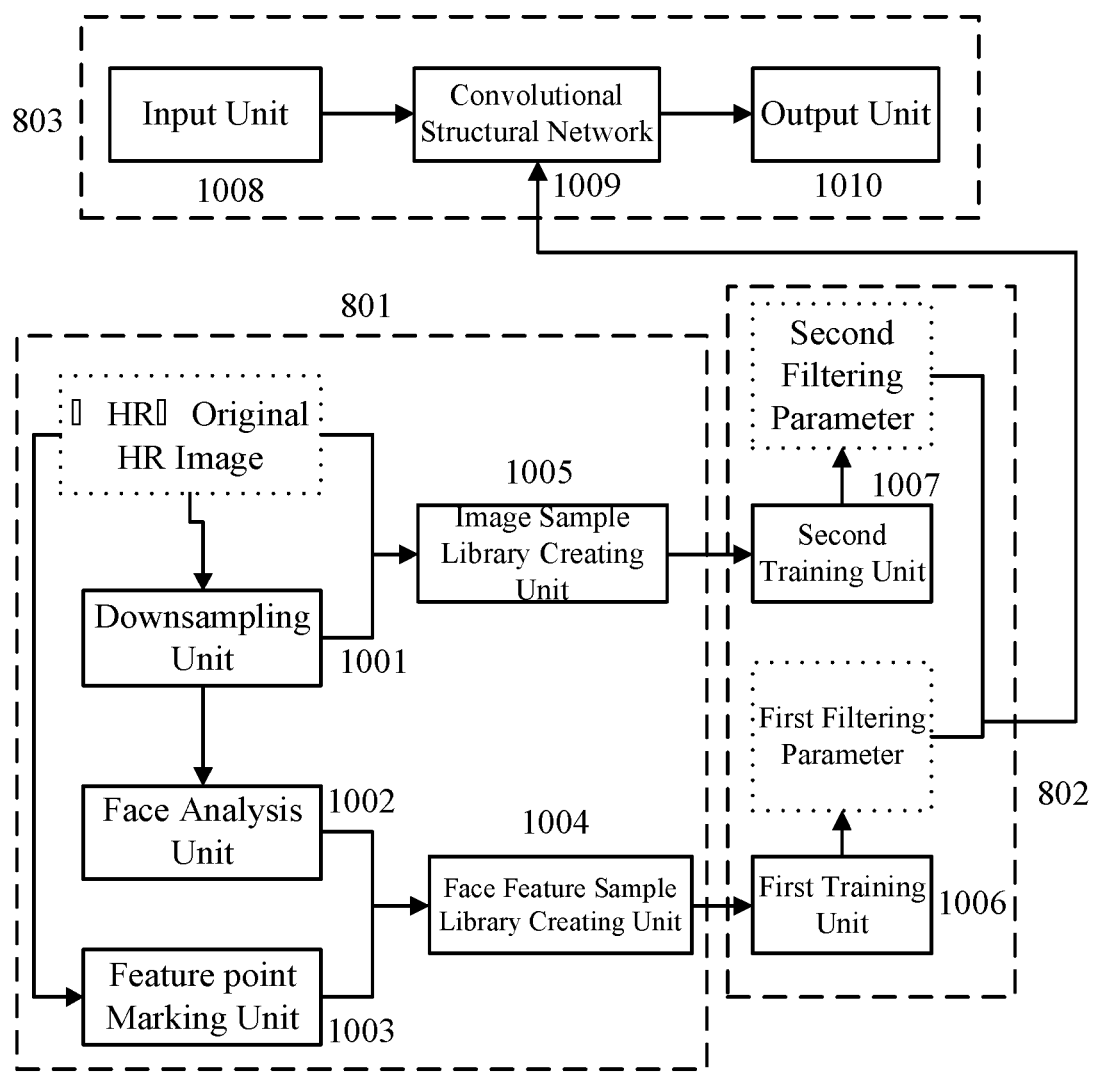
FIG. 10 is a block diagram illustrating the specific implementation of the resolving system in FIG. 8 provided by at least one embodiment of the present invention.

FIG. 10 is a block diagram illustrating the specific implementation of the resolving system in FIG. 8 provided by at least one embodiment of the present invention.

As shown in FIG. 10, the sample library creating device 801 in FIG. 8 further includes: a downsampling unit 1001, a face analysis unit 1002, a feature point marking unit 1003, a face feature sample library creating unit 1004 and an image sample library creating unit 1005. The training device 802 in FIG. 8 further includes a first training unit 1006 and a second training unit 1007. The output device 803 in FIG. 8 further includes: an input unit 1008, a convolutional structural network 1009 and an output unit 1010.

The downsampling unit 1001 is configured to obtain an LR image set by the downsampling of an original HR image set, in which the downsampling process, for instance, may adopt linear convolution processing or the conventional or future processing method capable of achieving the same function.

The face analysis unit 1002 is configured to extract face feature information of LR images from the LR images by a face feature extraction method, in which the face feature extraction method may be edge detection algorithm or the conventional or future method capable of achieving the same function.

The feature point marking unit 1003 is configured to obtain face feature information of HR images by marking face feature points on the HR images.

The face feature sample library creating unit 1004 is configured to create a face feature sample library, including pairs of the face feature information of the LR images and relevant face feature information of the HR images, by utilization of the face feature information of the LR images and the face feature information of the HR images.

The image sample library creating unit 1005 is configured to create an image sample library, including pairs of the LR images and relevant HR images, by utilization of the LR images and the HR images.

The first training unit 1006 is configured to obtain first filtering parameters by training the pairs of the face feature information of the LR images and the face feature information of the HR images in the face feature sample library.

The second training unit 1007 is configured to obtain second filtering parameters by training the pairs of the LR images and the HR images in the image sample library.

The input unit 1008 is configured to input the face feature information of the LR images and/or the image as an input signal.

The convolutional structural network 1009 is configured to process the inputted face feature information of the LR images and/or the inputted image by utilization of the convolutional structural network according to the adjusted first and/or second filtering parameters.

The output unit 1010 is configured to output face feature information of the HR images and/or the image, processed by the convolutional structural network, as an output signal.

The specific training process of the training units in FIGS. 9 and 10 may refer to the specific training process in FIGS. 5 and 7. Therefore, no further description will be given here.

The resolving system based on deep learning includes a parallelizing and hierarchical design training model and a resolving model, and has the following advantages:

1. Expandability: data after expansion may be processed by simple expansion hardware, without a large change algorithm;
2. High-efficiency: complex algorithms are allocated into parallelizing design, and different servers operate mutually independent;
3. Variability: due to the modular design, the design proposals of functional modules may be modified by latter optimization.

It should be understood that: when an "element" is "connected" or "coupled" to another element, the element may be directly connected or coupled to another element or an intermediate element may be provided. Oppositely, when an element is "directly connected" or "directly coupled" to another element, an intermediate element is not provided. The same reference numerals in the accompanying drawings refer to same elements. The term "and/or" herein indicates that any or all the combinations in one or a plurality of relevant listed items.

It should be understood that: although the terms first, second, third and the like may be used here to describe elements, components and/or parts, the elements, components and/or parts are not limited by the terms. The terms are only used for distinguishing the elements, components or the parts. Therefore, the first element, component or part stated below may be referred to as a second element, component or part without departing from the teaching of the present invention.

The terms used herein are only for the purpose of describing specific embodiments and not intended to limit the present invention. The singular forms "a", "an" and "that (this)" used herein are also intended to include plural forms, unless explicitly indicated in the context. It should be understood that the term "include" indicates the presence of the features, integers, steps, operations, elements and/or components when used in the description, but does not exclude the presence or addition of one or more other features, integers, steps, operations, elements, components and/or combinations thereof.

Unless otherwise defined, all the terms (including technical and scientific terms) used herein shall have the same meaning as commonly understood by those skilled in the art. It should be also understood that the terms such as those defined in the usual dictionary should be interpreted as having the meaning consistent with their meanings in the context of relevant technology, and should not be interpreted as idealized or extremely formalized meanings, unless otherwise defined.

The preferred embodiments of the present invention are described herein with reference to block diagrams and flow diagrams of the method and the device (system) provided by the embodiments of the present invention. It should be understood that each box of the flow diagram and/or the block diagram and the box combination of the flow diagram and/or the block diagram may be implemented by computer program instructions. These computer program instructions may be provided to a processor of a general purpose computer, a special purpose computer or other programmable data processing devices to produce a machine, so that a means for achieving a specific function/action in the box of the flow diagram and/or the block diagram can be created through the instruction executed by the processor of the computer or other programmable data processing devices.

These computer program instructions may also be stored in a computer readable memory and may direct a computer or other programmable data processing devices to operate in a particular manner, so that the instruction stored in the computer readable memory can produce a manufacturing item including an instruction means for achieving the specific function/action in the box of the flow diagram and/or the block diagram.

The computer program instructions may also be loaded onto the computer or other programmable devices, causing a series of operational steps to be performed on the computer or other programmable devices to generate computer-implemented processing, so that the instructions executed on the computer or other programmable devices can provide steps for achieving the specific function/action in the box of the flow diagram and/or the block diagram. Each box may represent a code module, fragment or portion which includes one or more executable instructions for implementing a specific logic function. It should be also noted that in other implementations, the functions marked in the boxes may not occur in the order as shown in the figure. For instance, according to the involved functions, two successive boxes may actually be executed substantially concurrently, or the boxes may sometimes be executed in reverse order.

The foregoing is a description of the present invention and should not be construed as the limiting of the present invention. Although a plurality of preferred embodiments of the present invention have been described, it can be easily understood by those skilled in the art that many modifications may be made to the preferred embodiments without departing from the novel teachings and advantages of the present invention. Therefore, all the modifications shall fall within the scope of protection of the present invention as defined by the appended claims. It should be understood that the foregoing is a description of the present invention and should not be construed as being limited to the preferred embodiments of the present invention, and the modifications on the embodiments and other embodiments of the present invention shall fall within the scope of the appended claims. The present invention is defined by the claims and equivalents thereof.

The present application claims the priority of the Chinese Patent Application No. 201610161589.2 filed on Mar. 21, 2016, which is incorporated herein in its entirety by reference as part of the disclosure of the present application.

The invention claimed is:
1. A resolving method, comprising:
  creating a sample library by utilization of an original high-resolution (HR) image set;

training a convolutional structural network by utilization of the sample library; and obtaining an HR output signal by processing a low-resolution (LR) input signal by utilization of the trained convolutional structural network, wherein the convolutional structural network is formed by an alternate connection of a plurality of convolutional layers and excitation layers, and each convolutional layer includes a plurality of filter units with adjustable filtering parameters, wherein the sample library includes a face feature sample library, and the creating the sample library by utilization of the original HR image set further includes:

obtaining an LR image set by a downsampling of the original HR image set;

extracting face feature information of LR images by a face feature extraction method;

obtaining face feature information of HR images by marking face feature points on the HR images; and creating the face feature sample library, including pairs of the face feature information of the LR images and relevant face feature information of the HR images, by utilization of the face feature information of the LR images and the face feature information of the HR images, wherein the training the convolutional structural network by utilization of the sample library further includes:

obtaining a high-pass filtering face result and a low-pass filtering face result by respectively performing high-pass filtering and low-pass filtering on the face feature information of the HR images; and obtaining a detail template of the face feature information of the HR images as a feedback signal of the convolutional structural network by a superimposition and a feature classification of the high-pass filtering face result and the low-pass filtering face result, wherein the high-pass filtering face result including structure and contour information of the face, the low-pass filtering face result including skin texture and roughness of the face.

2. The resolving method according to claim 1, wherein the training the convolutional structural network by utilization of the sample library further includes:

obtaining first filtering parameters for the convolutional structural network by analyzing a correlation between the pairs of the face feature information of the LR images and the relevant face feature information of the HR images in the face feature sample library; and adopting the face feature information of the LR images as an input signal of the convolutional structural network, adjusting the first filtering parameters in the convolutional structural network, and obtaining a forecast result signal, being the same with the feedback signal, by processing the input signal by utilization of the convolutional structural network according to the adjusted first filtering parameters.

3. The resolving method according to claim 2, wherein the obtaining the HR output signal by processing the LR input signal by utilization of the trained convolutional structural network further includes:

inputting the face feature information of the LR images;

processing the inputted face feature information of the LR images by utilization of the convolutional structural network according to the adjusted first filtering parameters; and outputting face feature information of the HR images, processed by the convolutional structural network.

4. The resolving method according to claim 2, wherein the sample library includes an image sample library, and the creating the sample library by utilization of the original HR image set further includes:

creating the image sample library, including pairs of the LR images and relevant HR images, by utilization of the LR image set and the HR image set.

5. The resolving method according to claim 4, wherein the training the convolutional structural network by utilization of the sample library further includes:

obtaining second filtering parameters of the convolutional structural network by analyzing a correlation between the pairs of the LR images and the relevant HR images;

obtaining a high-pass filtering result and a low-pass filtering result by respectively performing high-pass filtering and low-pass filtering on the HR images; obtaining a detail template of the HR images as a feedback signal of the convolutional structural network by a superimposition and a feature classification of the high-pass filtering result and the low-pass filtering result; and adopting the LR images as an input signal of the convolutional structural network, adjusting the second filtering parameters in the convolutional structural network, and obtaining a forecast result signal, being the same with the feedback signal, by processing the input signal by utilization of the convolutional structural network according to the adjusted second filtering parameters.

6. The resolving method according to claim 5, wherein the obtaining the HR output signal by processing the LR input signal by utilization of the trained convolutional structural network further includes:

inputting the LR images;

processing the inputted LR images by utilization of the convolutional structural network according to the adjusted second filtering parameters; and outputting HR images processed by the convolutional structural network.

7. The resolving method according to claim 6, wherein each filter unit adopts a formula F(x)=Wx+b to execute a convolution operation, where W and b refer to the filtering parameters; x refers to input; and F(x) refers to output.

8. The resolving method according to claim 7, wherein the forecast result signal is determined to be the same with the feedback signal when J(W,b) obtained according to the following formula is less than a first threshold:

$$J(W, b) = \frac{1}{m}\sum_{i=1}^{m}\left(\frac{1}{2}\left\|h_{W,b}(I_{HR_i} - I_{\overline{HR}_i})\right\|^2\right)$$

where J(W,b) refers to a mean square error; m refers to a number of image sets in the face feature sample library; $I_{HR_i}$ refers to the feedback signal; $I_{\overline{HR}_i}$ refers to the forecast result signal; and $h_{W,b}$ refers to a weight coefficient.

9. The resolving method according to claim 8, wherein when the forecast result signal is different from the feedback signal, a partial derivative of J(W,b) is calculated for each filtering parameter, and the first filtering parameters or the second filtering parameters are adjusted according to the partial derivatives.

10. The resolving method according to claim 9, wherein the first filtering parameters are classifier filtering parameters for the convolutional structural network.

11. A resolving system, comprising:
a sample library creating device configured to create a sample library by utilization of an original high-resolution (HR) image set;
a training device configured to train a convolutional structural network by utilization of the sample library; and
an output device configured to obtain an HR output signal by processing a low-resolution (LR) input signal by utilization of the trained convolutional structural network,
wherein the convolutional structural network is formed by an alternate connection of a plurality of convolutional layers and excitation layers, and
each convolutional layer includes a plurality of filter units with adjustable filtering parameters,
wherein the sample library includes a face feature sample library, and
the sample library creating device further includes:
a downsampling unit configured to obtain an LR image set by a downsampling of the original HR image set;
a face analysis unit configured to extract face feature information of LR images from the LR images by a face feature extraction method;
a feature point marking unit configured to obtain face feature information of HR images by marking face feature points on the HR images; and
a face feature sample library creating unit configured to create a face feature sample library, including pairs of the face feature information of the LR images and relevant face feature information of the HR images, by utilization of the face feature information of the LR images and the face feature information of the HR images,
wherein the training device further includes a first training unit configured to obtain a high-pass filtering face result and a low-pass filtering face result by respectively performing high-pass filtering and low-pass filtering on the face feature information of the HR images; and obtain a detail template of the face feature information of the HR images as a feedback signal of the convolutional structural network by a superimposition and a feature classification of the high-pass filtering face result and the low-pass filtering face result, wherein the high-pass filtering face result including structure and contour information of the face, the low-pass filtering face result including skin texture and roughness of the face.

12. The resolving system according to claim 11, wherein the training device further includes:
a first training unit configured to: obtain first filtering parameters of the convolutional structural network by analyzing a correlation between the pairs of the face feature information of the LR images and the relevant face feature information of the HR images in the face feature sample library; and adopt the face feature information of the LR images as an input signal of the convolutional structural network, adjust the first filtering parameters in the convolutional structural network, and obtain a forecast result signal, being the same with the feedback signal, by processing the input signal by utilization of the convolutional structural network according to the adjusted first filtering parameters.

13. The resolving system according to claim 12, wherein the sample library includes an image sample library, and the sample library creating device further includes:
an image sample library creating unit configured to create the image sample library, including pairs of the LR images and relevant HR images, by utilization of the LR images and the HR images.

14. The resolving system according to claim 13, wherein the training device further includes:
a second training unit configured to obtain second filtering parameters of the convolutional structural network by analyzing a correlation between the pairs of the LR images and the relevant HR images; obtain a high-pass filtering result and a low-pass filtering result by respectively performing high-pass filtering and low-pass filtering on the HR images; obtain a detail template of the HR images as a feedback signal of the convolutional structural network by a superimposition and a feature classification of the high-pass filtering result and the low-pass filtering result; and adopt the LR images as an input signal of the convolutional structural network, adjust the second filtering parameters in the convolutional structural network, and obtain a forecast result signal, being the same with the feedback signal, by processing the input signal by utilization of the convolutional structural network according to the adjusted second filtering parameters.

15. The resolving system according to claim 14, wherein the output device further includes:
an input unit further configured to input the face feature information and/or images with low resolution;
a convolutional structural network further configured to process the inputted face feature information of the LR images and/or the images by utilization of the convolutional structural network according to the adjusted first and/or second filtering parameters; and
an output unit further configured to output face feature information and/or images with high resolution, processed by the convolutional structural network.

16. The resolving system according to claim 15, wherein each filter unit adopts a formula F(x)=Wx+b to execute a convolution operation, where W and b refer to the filtering parameters; x refers to input; and F(x) refers to output.

17. The resolving system according to claim 16, wherein the forecast result signal is determined to be the same with the feedback signal when J(W,b) obtained according to the following formula is less than a first threshold:

$$J(W, b) = \frac{1}{m}\sum_{i=1}^{m}\left(\frac{1}{2}\left\|h_{W,b}(I_{HR_i}) - I_{\overline{HR}_i}\right\|^2\right)$$

where J(W,b) refers to a mean square error; m refers to a number of image sets in the face feature sample library; $I_{HR_i}$ refers to the feedback signal; $I_{\overline{HR}_i}$ refers to the forecast result signal; and $h_{W,b}$ refers to a weight coefficient.

18. The resolving system according to claim 17, wherein, when the forecast result signal is different from the feedback signal, a partial derivative of J(W,b) is calculated for each filtering parameter, and the first filtering parameters or the second filtering parameters are adjusted according to the partial derivatives.

* * * * *